Figure 1:
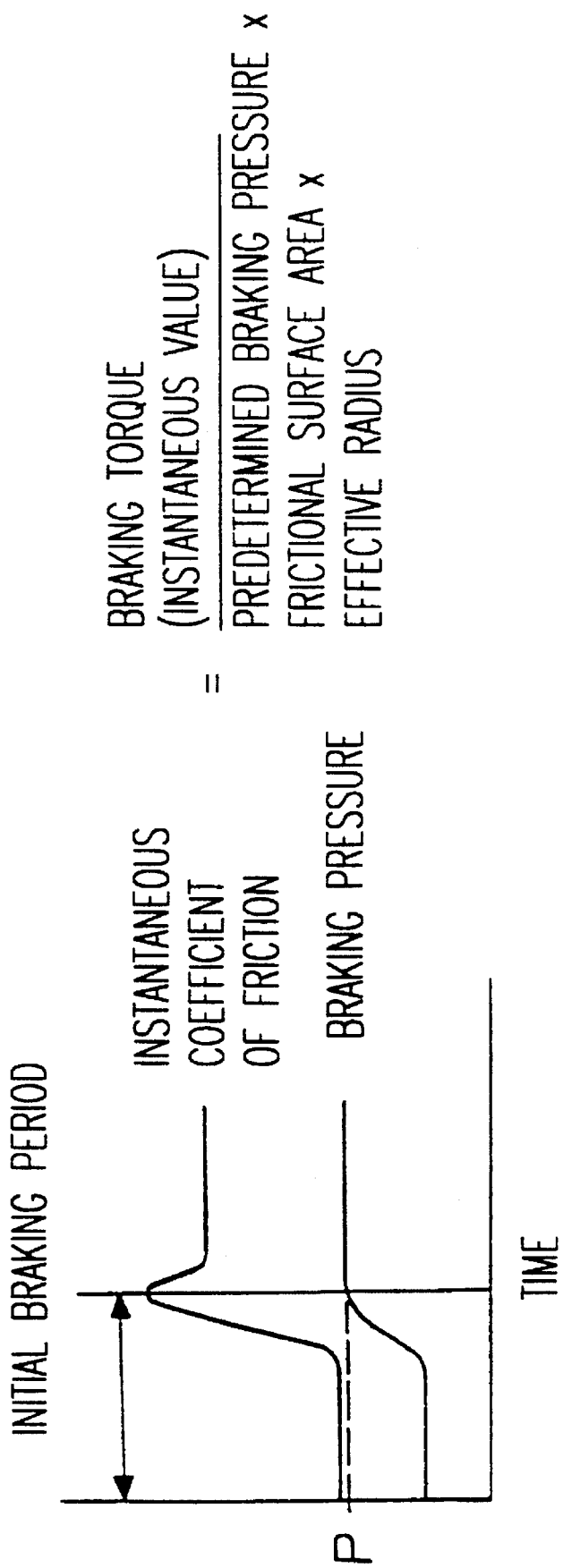

United States Patent [19]
Yamamoto et al.

[11] Patent Number: 5,566,792
[45] Date of Patent: Oct. 22, 1996

[54] SLIDING UNIT FOR A BRAKE AND METHOD OF PRODUCING THE SAME

[75] Inventors: Iwao Yamamoto; Kazuo Niwa; Hitoshi Seki; Toshirou Kusahara; Yoshiaki Inoue, all of Kagawa, Japan

[73] Assignee: Mitsubishi Chemical Corporation, Tokyo, Japan

[21] Appl. No.: 547,114

[22] Filed: Oct. 23, 1995

[30] Foreign Application Priority Data

Oct. 25, 1994 [JP] Japan .................................. 6-260536
Oct. 26, 1994 [JP] Japan .................................. 6-262846
Nov. 2, 1994 [JP] Japan .................................. 6-269779

[51] Int. Cl.$^6$ .................................................. F16D 49/00
[52] U.S. Cl. ............................... 188/218 XL; 188/251 A; 428/408
[58] Field of Search ................... 188/218 XL, 18 A, 188/251 A, 264 G, 250 G, 73.2; 428/408; 192/107 M, 70.14

[56] References Cited

U.S. PATENT DOCUMENTS 5,398,784  3/1975  Haneda et al.
5,439,080  8/1995  Haneda et al. ................... 188/218 XL

OTHER PUBLICATIONS

Database WPI, Derwent Publications, AN-92-117874, JP-A-04-046010, Feb. 17, 1992.
Database WPI, Derwent Publications, AN-95-281504, JP-A-07-180735, Jul. 18, 1995.
Database WPI, Derwent Publications, AN-88-135881, JP-A-63-076926, Jul. 4, 1988.
Database WPI, Derwent Publications, AN-92-320026, JP-A-04-224327, Aug. 13, 1992.
Database WPI, Derwent Publications, AN-92-326935, JP-A-04-231739, Aug. 20, 1992.

*Primary Examiner*—Josie Ballato
*Attorney, Agent, or Firm*—Oblon, Spivak, McClelland, Maier & Neustadt, P.C.

[57] ABSTRACT

A sliding unit for a brake comprising a disk and pads made of carbon-fiber reinforced carbon composite materials, characterized in that in evaluation by X-ray diffraction, the sliding surface of the disk to the pads has interplanar spacing of graphite's reflection (002) of disk $d002_{(disk)}$ of 3.37 Å–3.43 Å, and intensity ratio $I_{(disk)}/Ic$ of 60–90, which is obtained by dividing the integrated intensity of graphite's reflection (002) of disk $I_{(disk)}$ by the integrated intensity of (113) of $\alpha$-$Al_2O_3$ as a reference material Ic; the sliding surface of the pads to the disk has interplanar spacing of graphite's reflection (002) of pad $d002_{(pad)}$ of 3.42 Å–3.44 Å, and intensity ratio $I_{(pad)}/Ic$ of 45–75, which is obtained by dividing the integrated intensity of graphite's reflection (002) of pad $I_{(pad)}$ by the integrated intensity of (113) of $\alpha$-$Al_2O_3$ as a reference materials Ic, and $d002_{(disk)} < d002_{(pad)}$.

8 Claims, 2 Drawing Sheets

SLIDING UNIT FOR A BRAKE AND METHOD OF PRODUCING THE SAME

The present invention relates to a sliding unit for a brake comprising a disk and pads made of carbon-fiber reinforced carbon composite materials (hereinafter, referred to as C/C composite materials). In particular, the present invention relates to a sliding unit for a brake having high friction coefficient, quick response speed and excellent in wear resistance, and a method of producing the same.

In recent years, for a disk brake used for aircrafts and vehicles, C/C composite materials are used for a disk and pads which constitute a sliding unit for the brake, from the standpoint of reducing the weight and improving performance such as heat resistance.

In a C/C composite material used for the sliding unit for a brake, the required characteristics vary extensively depending on their type of applications. For instance, a brake for aircrafts requires to decelerate smoothly and to stop without an excessive shock to passengers at the time of braking. Accordingly, high friction coefficient is not required, and excessively quick response at the time of braking is undesirable. A brake for railways or other vehicles is also required to decelerate smoothly and to stop without an excessive shock to passengers and crews at the time of braking.

For racing cars or racing motorcycles, on the other hand, the large braking power is required in a short time from the start of braking, namely, high friction coefficient and quick response are required. Because, how quick the driver can decelerate before various corners in racing circuits is a big factor for victory or defeat. Further, the brake for racing cars undergoes severe conditions in comparison with the brake for aircrafts or vehicles in other fields, i.e. it undergoes higher sliding speed, higher pressure and higher temperature, so that the wear rate of the sliding unit in the brake could be extremely large. Accordingly, the brake for racing cars should have excellent wear resistance so that it is durable to drive throughout the race.

However, it was difficult for a brake made of conventional C/C composite material to satisfy simultaneously to have high friction coefficient, quick response speed and excellent wear resistance which are required for the brake for racing cars.

It is an object of the present invention to provide a sliding unit for a brake made of C/C composite materials which satisfies simultaneously three requisite characteristics: high friction coefficient, quick response speed and excellent wear resistance and to provide a method of producing the same.

According to the present invention, there is provided a sliding unit for a brake comprising a disk and pads made of carbon-fiber reinforced carbon composite materials, characterized in that in evaluation by X-ray diffraction, the sliding surface of the disk to the pads has interplanar spacing of graphite's reflection (002) of disk $d002_{(disk)}$ of 3.37 Å–3.43 Å, and intensity ratio $I_{(disk)}/Ic$ of 60–90, which is obtained by dividing the integrated intensity of graphite's reflection (002) of disk $I_{(disk)}$ by the integrated intensity of (113) of $\alpha$-$Al_2O_3$ as a reference material Ic; the sliding surface of the pads to the disk has interplanar spacing of graphite's reflection (002) of pad $d002_{(pad)}$ of 3.42 Å–3.44 Å, and intensity ratio $I_{(pad)}/Ic$ of 45–75, which is obtained by dividing the integrated intensity of graphite's reflection (002) of pad $I_{(pad)}$ by the integrated intensity of (113) of $\alpha$-$Al_2O_3$ as a reference materials Ic, and $d002_{(disk)} < d002_{(pad)}$.

According to the present invention, there is provided a sliding unit for a brake comprising a disk and pads made of a carbon-fiber reinforced carbon composite materials, characterized in that the average coefficient of dynamic friction $\mu avg$ is 0.30 or more; the maximum instantaneous coefficient of friction $\mu max$ in a period from the starting of braking to the time at which the braking pressure reaches a predetermined value P ($P=2$–$50$ kg/cm$^2$) is 0.60 or more, and wear rates of the disk and the pads are $7.0 \times 10^{-3}$ mm/(stop·surface) or less.

According to the present invention, there is provided a method of producing a sliding unit for a brake comprising forming a disk and pads made of carbon-fiber reinforced carbon composite materials, and assembling the disk and the pads to form the sliding unit for a brake, characterized in that the ratio of the carbon fiber content of the disk $Vf_{(disk)}$ to the carbon fiber content of the pads $Vf_{(pad)}$ is in a range of 1:1.2 to 1:2.5; final heat treatment temperature of the carbon-fiber reinforced carbon composite material for the pad HTT(pad) is 1400° C. or higher, and final heat treatment temperature of the carbon-fiber reinforced carbon composite material for the disk HTT(disk) is 100° C. or much higher than HTT(pad).

IN DRAWINGS

Figure 2:
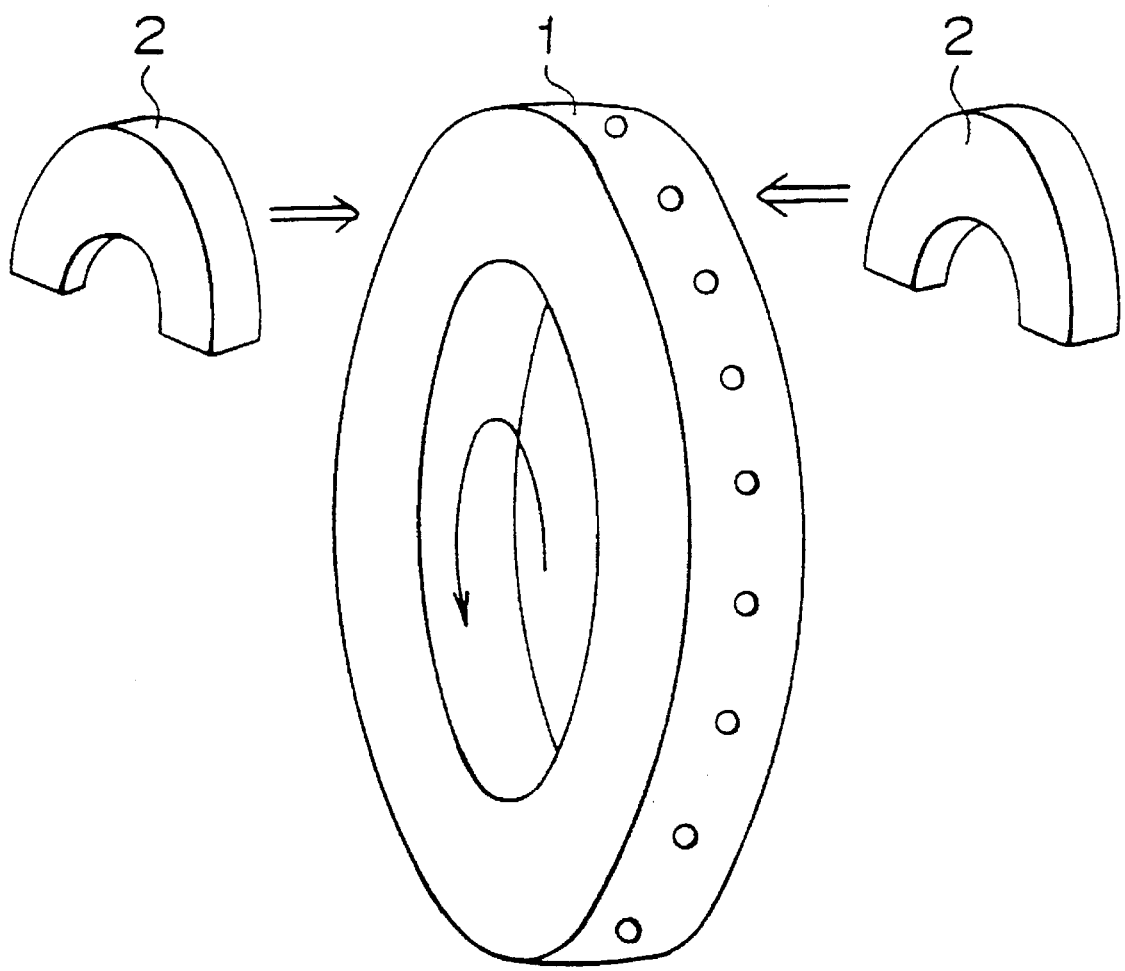

FIG. 1 is a diagram showing relations of instantaneous coefficient of friction to time, and braking pressure to time in friction tests on the present invention, and FIG. 2 is a schematic view in an exploded state of a sliding unit for a brake according to an embodiment of the present invention.

Preferred embodiments of a sliding unit for a brake and a method of producing the brake according to the present invention will be described in detail with reference to the drawings.

FIG. 2 shows an embodiment of a sliding unit for a brake comprising a disk 1 and pads 2.

A C/C composite material used for the sliding unit for a brake according to the present invention is produced in a manner as described below.

As carbon fibers used for the C/C composite material, well-known carbon fibers such as pitch based carbon fibers, polyacrylonitrile (PAN) based carbon fibers, rayon based carbon fibers or the like are used. The carbon fibers are preferably in a form of short fibers which are obtained by cutting tow, strand, roving or yarn which consists of a bundle of 2000–8000 monofilaments. In the present invention, short fibers having a length of about 3–100 mm, preferably about 5–50 mm are usually used. The diameter and the modulus of the carbon fibers themselves may be in a range of value usually used for the C/C composite material, and are not in particular limited.

Bundles of the above-mentioned carbon fibers are dispersed and splitted. The splitted carbon fibers are randomly oriented in a two-dimensional direction so that the carbon fibers are randomly oriented in a plane in parallel to the sliding surface of a disk or pads to be prepared, whereby a sheet is formed. In this case, inorganic fibers or inorganic materials such as SiC, $Al_2O_3$, carbon black or the like is added if necessary.

The obtained sheet is impregnated with resin, petroleum type pitch or coal type pitch followed by drying it to thereby form a prepreg sheet. As the resin used, a phenol resin or a fran resin is preferably used, for instance.

A plurality of prepreg sheets thus obtained are laminated, and then, the laminate is press-molded at a temperature of 100° C.–500° C. to thereby form a disk or pads having a desired shape which is used as a sliding unit for a brake of C/C composite material. The number of prepreg sheets to be laminated is suitably determined depending on the shape and the size of the disk or the pads to be prepared.

The obtained disk or pads are located in an inert gas atmosphere such as nitrogen gas, and the temperature of the atmosphere is generally raised to 800° C.–2800° C. at a heating rate of 1°–200° C./h, and the disk or the pads are baked for 0.5–5 hours.

Further, the disk and the pads of C/C composite materials are subjected to densifying process like an impregnating method wherein pores in the disk and the pads are filled by impregnating the above-mentioned resin or pitch, and then they are baked in an inert gas atmosphere for carbonization, or CVD method wherein the disk and the pads are contacted with gas containing carbon such as methane, propane or the like at a high temperature whereby carbon resulted from thermal decomposition of the gas is deposited in the pores. Such method is repeatedly utilized to densifying the disk and the pads. The temperature for heat treatment for the densification should be lower than the temperature of the final heat treatment which is conducted in the next. The degree of densification is suitably determined depending on kinds and characteristics of the disk and the pads to be prepared.

Usually, the final heat treatment is conducted by heating the disk and the pads of C/C composite materials at a temperature higher than 1400° C. for more than an hour. When the final heat treatment is conducted at a lower temperature, a sufficient graphitization can not be obtained, more specifically, a sufficient amount of graphite can not be obtained in the sliding surface of the disk and the pads whereby there are disadvantageous of lower friction coefficient and lower response speed and deterioration in wear resistance.

In the present invention, final heat treatment of the C/C composite material for the disk is conducted at 100° C. or much higher than the temperature of final heat treatment for the pad, preferably 300° C.–1000° C. much higher than, more preferably, 400° C.–800° C. much higher than the temperature for the pad. The temperature for the final heat treatment of the C/C composite material for the disk is preferably 1500° C.–2800° C., more preferably 1800° C.–2600° C. The temperature for the final heat treatment of the C/C composite material for the pad is preferably 1500° C.–2700° C., more preferably, 1700° C.–2500° C. When the final heat treatment for the disk is conducted at the same or lower temperature as that for the pad, the degree of graphitization of the disk is about the same as or lower than that of the pad, thereby disadvantageously deteriorating the wear resistance of the pad.

Further, a feature in the present invention resides in that the carbon fiber content of C/C composite material of the pad $Vf_{(pad)}$ is higher than the carbon fiber content of C/C composite material of the disk $Vf_{(disk)}$. The ratio of the carbon fiber contents is preferably $Vf_{(disk)}: Vf_{(pad)}=$ 1:1.2–1:2.5, more preferably, $Vf_{(disk)}: Vf_{(pad)}=$1:1.5–1:2. $Vf_{(disk)}$ is preferably 4%–55%, more preferably 15%–30%. $Vf_{(pad)}$ is preferably 5%–65%, more preferably, 35%–50%. When $Vf_{(disk)}$ is higher than $Vf_{(pad)}$, the wear resistance property of the pad disadvantageously decreases.

A desired carbon fiber content of the disk or the pads of C/C composite material can be obtained by suitably selecting an amount of carbon fibers as raw material, a degree of densification and so on.

The carbon fiber contents of the disk and the pads of C/C composite materials can be obtained as mentioned below, for instance.

When Wf is the weight of carbon fibers measured in a first step of pressing, heating and molding is Wf, the weight of carbon fibers contained in the composite material remains Wf even though the carbon fibers have been subjected to operations of baking and densifying conducted thereafter. Accordingly, a carbon fiber volume content Vf can be obtained by dividing Wf by the product of density of the carbon fibers at the maximum temperature in heat treatment ρf and the volume V of the composite material in the final step, as described in formula (A):

$$Vf=Wf/(\rho f \cdot V) \times 100(\%) \tag{A}$$

When the composite material undergoes a machining process in a series of processing steps, there is a change of Wf in an amount corresponding to a cut portion. Accordingly, it is necessary to correct the weight by multiplying Wf with the rate of weight change of the composite material before and after the machining step X(%).

When the weight of the carbon fibers at the time of molding can not be obtained directly, weight fraction of the carbon fibers in the prepreg FC is first obtained, and multification of the weight of the prepreg used for the molding and the value FC is conducted to thereby obtain the weight Wf of the carbon fibers. The value FC may be calculated from a change of weight between the weight of the prepreg containing resin and the weight of the prepreg in which the resin is removed with solvent.

When there is no data on preparation of the composite material, the carbon fiber volume content of the composite material can be obtained as follows. The composite material is cut and polished. Then, a picture of the cross-sectional surface of the material is taken with a microscope so that a proportion of the surface area occupied by the carbon fibers is obtained. The proportion of the surface area corresponds to the carbon fiber volume content.

In the disk and the pads of C/C composite materials obtained by the above-mentioned method in the present invention, a degree of graphitization and an amount of graphite oriented in the sliding surface of the disk are different from those of the pads. Namely, the degree of graphitization of graphite oriented in the sliding surface of the disk is larger than that of the pads. Further, the degrees of graphitization and the amount of graphite in the sliding surface of the disk and pads are respectively within specified ranges.

In the present invention, the X-ray diffraction method is used to measure the degree of graphitization of the graphite component and the amount of graphite component oriented in the sliding surface of a brake. Since the X-ray diffraction method is an evaluation method utilizing diffraction of X-rays caused by crystallites in a sample material, it is possible to detect precisely the degree of graphitization and the amount of graphite component in the sample material.

In the sliding unit for a brake which consists of a disk and pads made of C/C composite materials, the factor influencing the friction coefficient and the wear resistance is not an amount of the graphite component dispersed in the whole portion of the C/C composite materials, but an amount of the graphite component oriented in the sliding surface. Accordingly, in order to detect only the graphite component oriented in the sliding surface, a plate-like sample material having a smooth surface as a portion of the sliding surface has to be measured, and measurement with a sample material in a powder form is not preferred because it reflects the graphite component dispersed in the whole portion of the composite material.

As an index of graphitization, interplanar spacing d002 is used, which is obtainable from the diffraction angle of a (002) diffraction line of graphite. The interplanar spacing d002 of a carbon material generally takes a value in a range of 3.35 Å–3.48 Å, and the value becomes smaller as a degree of graphitization is higher.

As an index of an amount of graphite component, an integrated intensity of the (002) diffraction line, i.e. a peak area is used. Since the integrated intensity of X-ray diffraction varies depending on measuring conditions and measuring devices used, values obtained by measurement can not be used as they are, and standardization with use of a certain means is necessary. In the present invention, an $\alpha$-$Al_2O_3$ powder in Standard Reference Material (SRM) 674 which is a standard material set for quantitative analysis of X-ray diffraction of powder, commercialized from "The National Bureau of Standards", is used. Measurement of X-diffraction of the $\alpha$-$Al_2O_3$ is separately conducted, and relative intensity I/Ic of the (002) diffraction line of the plate-like sample material is obtainable wherein the integrated intensity Ic of the obtained (113) diffraction line is 1, whereby standardization can be effected without dependence of the measuring conditions and measuring devices to be used. As the value I/Ic is larger, an amount of graphite component is more. In this case, it is necessary that the plate-like sample material of C/C composite material and the sample of $\alpha$-$Al_2O_3$ powder undergo the same conditions of measurement on X-ray diffraction. The conditions of measurement in the present invention are use of Cu tube, 5 kV-10 mA as an applied power, 1°, 0.3 mm and 1° of slits for diffusion, light receiving and scattering respectively, 0.1 sec. of time constant, 1°2θ/min of scanning speed and 10×21 mm of the surface area of sample at an X-ray irradiating portion.

In the sliding unit for a brake according to the present invention, C/C composite material is used for the disk wherein the before-mentioned value $d002_{(disk)}$ takes 3.37 Å–3.43 Å, preferably, 3.37 Å–3.41 Å, and the before-mentioned value $I_{(disk)}/Ic$ takes 60–90, preferably 70–90. C/C composite material is used for the pads wherein the before-mentioned value $d002_{(pad)}$ in the sliding surface to the disk takes 3.42 Å–3.44 Å, preferably 3.43 Å–3.44 Å, and the before-mentioned value $I_{(pad)}/Ic$ takes 45–75, preferably 60–75. Further, the disk and the pads are combined with each other so that the value $d002_{(disk)}$ is smaller than the value $d002_{(pad)}$.

When the value I/Ic of the disk or the pads is smaller than the above-mentioned range, the friction coefficient and the response speed are decreased in a particular case that braking pressure is low. When the value I/Ic of the disk or the pads is larger than the above-mentioned range, the wear resistance is decreased.

When the value $d002_{(disk)}$ is larger than the value $d002_{(pad)}$, namely, the degree of graphitization of the graphite component oriented in the sliding surface of the disk is lower than that of the pad, the wear resistance property of the pads is deteriorated.

The degree of graphitization of the graphite component and the amount of the graphite component oriented in the sliding surface of a brake can be controlled by suitably selecting raw materials used and conditions of manufacture. For instance, the degree of graphitization of the graphite component in the C/C composite material can be changed depending on kinds of elements used. As raw material for carbon fibers, it is known that pitch based carbon fibers are apt to be graphitized rather than rayon based or PAN based carbon fibers. It is also known that in a form of matrix, pitch is apt to be graphitized in comparison with thermoset resin and the degree of graphitization in pyrolytic carbon from CVD method is changed depending on conditions of vapor deposition. Further, it is known that a history of heat treatment for each component substantially affects the degree of graphitization, and the degree of graphitization becomes higher when it suffers from the heat treatment at higher temperature for longer time. Accordingly, the degree of graphitization of the graphite component oriented in the sliding surface of the brake can be controlled by suitably selecting raw material and conditions of manufacture.

Further, the amount of graphite component oriented in the sliding surface can be changed by adjusting a proportion of the above-mentioned elements used. Since the carbon fibers, in particular, the pitch based carbon fibers having high degree of graphitization has extremely high degree of orientation of graphite crystal in the direction of fiber axis. Accordingly, when the degree of orientation of the carbon fibers with respect to the sliding surface is changed, the amount of the graphite component oriented in the sliding surface can be changed even though the amount of the graphite component in the entire portion of the C/C composite material is the same. In C/C composite material made of laminating sheets in which carbon fibers are randomly dispersed in two-dimensional direction in parallel to the sliding surface, the amount of graphite component oriented in the sliding surface becomes large since there are a large number of carbon fibers oriented in parallel to the sliding surface. On the contrary, in C/C composite material wherein carbon fibers are dispersed randomly in a three-dimensional direction, there are many carbon fibers oriented in perpendicular to the sliding surface, and accordingly, the amount of graphite component oriented in the sliding surface is small. Thus, by suitably selecting conditions of manufacture, the amount of graphite component oriented in the sliding surface of the C/C composite material can be controlled. In order to control the degree of graphitization, manufacture of the composite material should be conducted several times under different conditions with use of raw material previously selected, whereby the most preferable condition can be obtained.

In the sliding unit for a brake produced in accordance with the present invention, the average coefficient of friction between the disk and the pads is as high as 0.30 or more, preferably, 0.35–0.70, which indicates high friction coefficient. Further, the maximum instantaneous coefficient of friction in a period from the starting of braking to the time at which the braking pressure reaches 2–50 $kg/cm^2$ (hereinbelow, referred to as an initial braking period) is 0.60 or more, preferably 0.65–3.0, which shows excellent response. Further, the disk and the pads exhibit excellent wear resistance properties such as $7.0 \times 10^{-3}$ mm or less per one stop and one plane, preferably $5.0 \times 10^{-3}$ mm or less per one stop and one plane.

The average dynamic coefficient of friction, the maximum instantaneous coefficient of friction in an initial braking period and the wear rate have been measured in friction tests with an inertia type dynamometer and under such test conditions that a brake pressure (pressure to the sliding surface) is 20 $kg/cm^2$ and a sliding speed is in a range of 10 m/sec ($E=1.2 \times 10^2$ $J/cm^2$ where E is absorption energy per unit surface area)–25 m/sec ($E=7.7 \times 10^2$ $J/cm^2$).

FIG. 1 is a diagram showing relations between the instantaneous coefficient of friction and time and between the braking pressure and time in the friction tests for the present invention.

As described above, in accordance with the present invention, the sliding unit for a brake having high performance can be manufactured, which is very useful in industry. The sliding unit for a brake can maintain high friction coefficient in a range from low speed-low pressure to high speed-high pressure; provides a high instantaneous coefficient of friction in an initial braking period; has excellent wear resistance property, and provides stable braking effect. Further, a carbon brake using the sliding unit has high friction coefficient, quick response and excellent durability.

Now, the present invention will be described in detail with reference to Examples. However, it should be understood that the present invention is by no means restricted by such specific Examples.

EXAMPLE 1

Pitch based carbon fibers of 30 mm long were splitted. The splitted carbon fibers were dispersed and oriented randomly in a two-dimensional direction to obtain sheets. The sheets were impregnated with phenol resin diluted with ethanol followed by drying to form prepreg sheets. The obtained prepreg sheets were laminated in a metal mold. The obtained lamination was press-molded at 250° C. to form a molded product for a disk with carbon fiber volume content Vf of about 20%. The obtained molded product was baked by heating it to 2000° C. in an inert atmosphere. Then, the obtained molded product was impregnated with pitch to fill out pores in the product followed by baking for carbonization at 1000° C. in an inert atmosphere (densifying step). The densifying step was repeated several times. Further, the final heat treatment was conducted at 2400° C. in an inert atmosphere to obtain C/C composite material for the disk. d002 of the material was 3.38 Å and I/Ic of the material was 75.

C/C composite material for the pad was prepared in the same manner as that for the disk except that the temperature of the final heat treatment HTT was 1800° C. and the carbon fiber volume content was about 40%. d002 of the material was 3.43 Å, and I/Ic of the material was 67.

Thus obtained disk and pads of C/C composite materials were combined to prepare a sliding unit for a brake.

Friction tests were conducted with an inertia type dynamometer under the conditions of sliding speeds of 11, 18 and 25 m/sec and interface pressures of 16, 20 and 24 kg/cm$^2$ to measure the average dynamic coefficient of friction, the maximum instantaneous coefficient of friction in an initial braking period (until the braking pressure reaches 16, 20 or 24 kgf/cm$^2$) and the wear rates. Results are shown in Table 2.

COMPARATIVE EXAMPLE 1

A disk and pads made of the same C/C composite material with Vf of about 20% and HTT of 2000° C. were prepared in a same manner as Example 1. d002 and I/Ic of the material are shown in Table 1.

Friction tests were conducted in the same manner as Example 1

Results obtained are shown in Table 2.

In the Comparative Example 1, the average dynamic coefficient of friction are lower; the maximum instantaneous coefficient of friction in an initial braking period are extremely low, and the wear rates of the pads are larger in comparison with Example 1.

COMPARATIVE EXAMPLE 2

A C/C composite material with Vf of about 40%; d002 of 3.42 Å and I/Ic of 40 was used for a disk, and a C/C composite material with Vf of about 40%, d002 of 3.42 Å and I/Ic of 44 was used for pads. The disk and the pads were assembled to form a sliding unit for a brake.

Friction tests were conducted in the same manner as Example 1

Results obtained are shown in Table 2.

In Comparative Example 2, the average dynamic coefficient of friction and the maximum instantaneous coefficient of friction in an initial braking period are respectively lower, and the wear rates of the pads are larger in comparison with Example 1.

EXAMPLE 2

A C/C composite material for the disk with Vf of about 20% was prepared in a same manner as the C/C composite material for the disk in Example 1 except HTT of 2000° C. Also, a C/C composite material for the pads with Vf of about 40% was prepared in a completely same manner as the C/C composite material for the pads in Example 1. d002 and I/Ic of the materials are shown in Table 1. The obtained disk and pads were assembled to form a sliding unit for a brake.

Friction tests were conducted in the same manner as Example 1.

Results obtained are shown in Table 2.

COMPARATIVE EXAMPLE 3

A C/C composite material for the disk with Vf of about 40% was HTT of 1800° C. was prepared in the completely same manner as the C/C composite material for the pads in Example 1. Also, a C/C composite material for the pads with Vf of about 20% and HTT of 2400° C. was prepared in the completely same manner as the C/C composite material for the disk in Example 1. d002 and I/Ic of the materials are shown in Table 1. The obtained disk and pads were assembled to form a sliding unit for a brake.

Friction tests were conducted in the same manner as Example 1.

Results obtained are shown in Table 2.

The average dynamic coefficient of friction and the maximum instantaneous coefficient of friction are lower and the wear rates of the pads are larger in comparison with Example 1.

TABLE 1

|  |  | Vf (%) | Temperature of final heat treatment | d002 | I/Ic |
|---|---|---|---|---|---|
| Example 1 | Disk | 20 | 2400 | 3.38 | 75 |
|  | Pad | 40 | 1800 | 3.43 | 67 |
| Example 2 | Disk | 20 | 2000 | 3.42 | 61 |
|  | Pad | 40 | 1800 | 3.43 | 67 |
| Comparative Example 1 | Disk | 20 | 2000 | 3.42 | 67 |
|  | Pad | 20 | 2000 | 3.42 | 61 |
| Comparative Example 2 | Disk | 40 | — | 3.42 | 40 |
|  | Pad | 40 | — | 3.42 | 44 |
| Comparative Example 3 | Disk | 40 | 1800 | 3.43 | 67 |
|  | Pad | 20 | 2400 | 3.38 | 75 |

TABLE 2

| | Bearing pressure (kg/cm²) | | | | | | | |
|---|---|---|---|---|---|---|---|---|
| | 16 | | | | 20 | | | |
| | Sliding speed (m/s) | | | | | | | |
| | 18 | | | | 11 | | | |
| | Average coefficient of friction | Maximum instantaneous coefficient of friction in initial braking period | Wear rate [×10⁻³ mm/ (stop · surface)] | | Average coefficient of friction | Maximum instantaneous coefficient of friction in initial braking period | Wear rate [×10⁻³ mm/ (stop · surface)] | |
| | | | Disk | Pad | | | Disk | Pad |
| Example 1 | 0.44 | 0.76 | 2.1 | 3.6 | 0.41 | 0.70 | 1.8 | 3.0 |
| Example 2 | — | — | — | — | — | — | — | — |
| Comparative Example 1 | 0.27 | 0.55 | 3.9 | 12.0 | — | — | — | — |
| Comparative Example 2 | 0.35 | 0.51 | 2.1 | 5.3 | 0.33 | 0.55 | 3.1 | 8.3 |
| Comparative Example 3 | 0.40 | 0.71 | 1.1 | 13.9 | 0.34 | 0.64 | 1.5 | 17.2 |

| | Bearing pressure (kg/cm²) | | | | | | | |
|---|---|---|---|---|---|---|---|---|
| | 20 | | | | 20 | | | |
| | Sliding speed (m/s) | | | | | | | |
| | 18 | | | | 25 | | | |
| | Average coefficient of friction | Maximum instantaneous coefficient of friction in initial braking period | Wear rate [×10⁻³ mm/ (stop · surface)] | | Average coefficient of friction | Maximum instantaneous coefficient of friction in initial braking period | Wear rate [×10⁻³ mm/ (stop · surface)] | |
| | | | Disk | Pad | | | Disk | Pad |
| Example 1 | 0.46 | 0.74 | 1.6 | 3.2 | 0.39 | 1.36 | 1.4 | 2.4 |
| Example 2 | — | — | — | — | 0.49 | 1.32 | 1.2 | 4.7 |
| Comparative Example 1 | 0.36 | 0.39 | 2.4 | 8.5 | 0.51 | 1.41 | 1.3 | 6.6 |
| Comparative Example 2 | 0.42 | 0.70 | 1.4 | 2.8 | 0.36 | 0.86 | 2.2 | 4.2 |
| Comparative Example 3 | 0.47 | 0.73 | 1.0 | 7.9 | 0.40 | 1.48 | 0.6 | 7.0 |

| | Bearing pressure (kg/cm²) | | | | | | | |
|---|---|---|---|---|---|---|---|---|
| | 24 | | | | 24 | | | |
| | Sliding speed (m/s) | | | | | | | |
| | 18 | | | | 25 | | | |
| | Average coefficient of friction | Maximum instantaneous coefficient of friction in initial braking period | Wear rate [×10⁻³ mm/ (stop · surface)] | | Average coefficient of friction | Maximum instantaneous coefficient of friction in initial braking period | Wear rate [×10⁻³ mm/ (stop · surface)] | |
| | | | Disk | Pad | | | Disk | Pad |
| Example 1 | — | — | — | — | 0.37 | 1.40 | 1.5 | 2.7 |
| Example 2 | 0.47 | 0.74 | 0.9 | 3.8 | 0.45 | 1.35 | 1.3 | 5.1 |
| Comparative Example 1 | — | — | — | — | — | — | — | — |
| Comparative Example 2 | 0.32 | 0.60 | 1.4 | 2.5 | 0.37 | 0.83 | 3.3 | 5.4 |
| Comparative Example 3 | — | — | — | — | 0.39 | 1.32 | 0.8 | 25.4 |

We claim:

1. A sliding unit for a brake comprising a disk and pads made of carbon-fiber reinforced carbon composite materials, characterized in that:

in evaluation by X-ray diffraction, the sliding surface of the disk to the pads has interplanar spacing of graphite's reflection (002) of disk $d002_{(disk)}$ of 3.37 Å–3.43 Å, and intensity ratio $I_{(disk)}/Ic$ of 60–90, which is obtained by dividing the integrated intensity of graphite's reflection (002) of disk $I_{(disk)}$ by the integrated intensity of (113) of $\alpha$-$Al_2O_3$ as a reference material Ic;

the sliding surface of the pads to the disk has interplanar spacing of graphite's reflection (002) of pad $d002_{(pad)}$ of 3.42 Å–3.44 Å, and intensity ratio $I_{(pad)}/Ic$ of 45–75, which is obtained by dividing the integrated intensity of graphite's reflection (002) of pad $I_{(pad)}$ by the integrated intensity of (113) of $\alpha$-$Al_2O_3$ as a reference materials Ic, and $d002_{(disk)} < d002_{(pad)}$.

2. A sliding unit for a brake according to claim 1, wherein $d002_{(disk)}$ is 3.37 Å–3.41 Å, $I_{(disk)}/Ic$ is 70–90, $d002_{(pad)}$ is 3.43 Å–3.44 Å and $I_{(pad)}/Ic$ is 60–75.

3. A sliding unit for a brake comprising a disk and pads made of a carbon-fiber reinforced carbon composite materials, characterized in that:

the average coefficient of dynamic friction μavg is 0.30 or more; the maximum instantaneous coefficient of friction μmax in a period from the starting of braking to the time at which the braking pressure reaches a predetermined value P (P=2–50 kg/cm$^2$) is 0.60 or more, and wear rates of the disk and the pads are $7.0 \times 10^{-3}$ mm/(stop·surface) or less.

4. A sliding unit for a brake according to claim 3, wherein μavg is 0.35 or more, μmax is 0.65 or more, and wear rates of the disk and the pads are $5.0 \times 10^{-3}$ mm/(stop·surface) or less.

5. A sliding unit for a brake according to claim 4, wherein μavg is 0.35–0.70, μmax is 0.65–3.00, and wear rates of the disk and the pads are $5.0 \times 10^{-3}$ mm/(stop·surface) or less.

6. A method of producing a sliding unit for a brake comprising forming a disk and pads made of carbon-fiber reinforced carbon composite materials, and assembling the disk and the pads to form the sliding unit for a brake, characterized in that:

the ratio of the carbon fiber content of the disk $Vf_{(disk)}$ to the carbon fiber content of the pads $Vf_{(pad)}$ is in a range of 1:1.2 to 1:2.5;

final heat treatment temperature of the carbon-fiber reinforced carbon composite material for the pad HTT(pad) is 1400° C. or higher, and final heat treatment temperature of the carbon-fiber reinforced carbon composite material for the disk HTT(disk) is 100° C. or much higher than HTT (pad).

7. A method according to claim 6, wherein $Vf_{(disk)}$ is 4–55%, $Vf_{(pad)}$ is 5–65%, HTT(disk) is 1500°–2800° C. and HTT(pad) is 1400°–2700° C.

8. A method according to claim 6, wherein $Vf_{(disk)}$ is 15–30%, $Vf_{(pad)}$ is 35–50%, HTT(disk) is 1800°–2600° C. and HTT(pad) is 1700°–2500° C.

* * * * *